Figure 4:
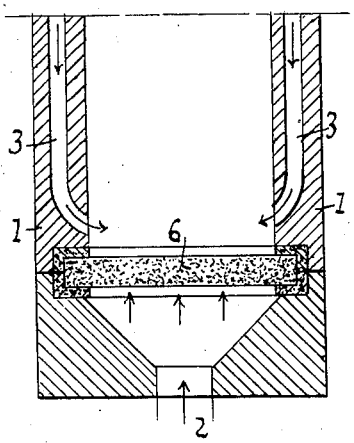

Dec. 6, 1932.                  C. KRAUCH ET AL                  1,890,435
            PRODUCTION OF VALUABLE LIQUID PRODUCTS FROM TARS, MINERAL
                OILS, AND THE LIKE CARBONACEOUS MATERIALS
                      Filed Aug. 13, 1926         2 Sheets-Sheet 1
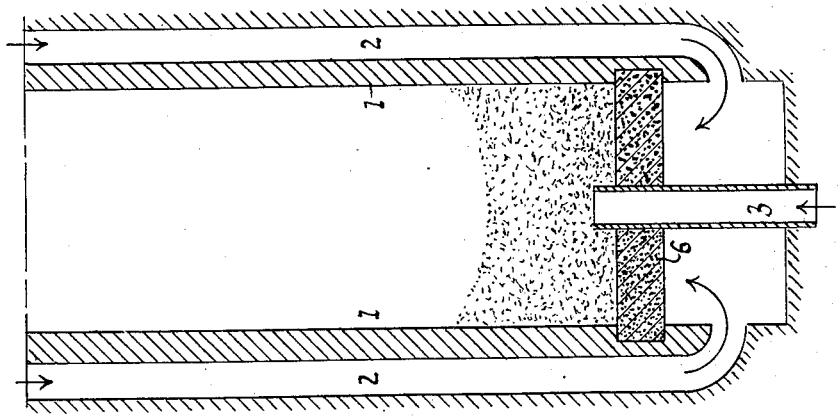
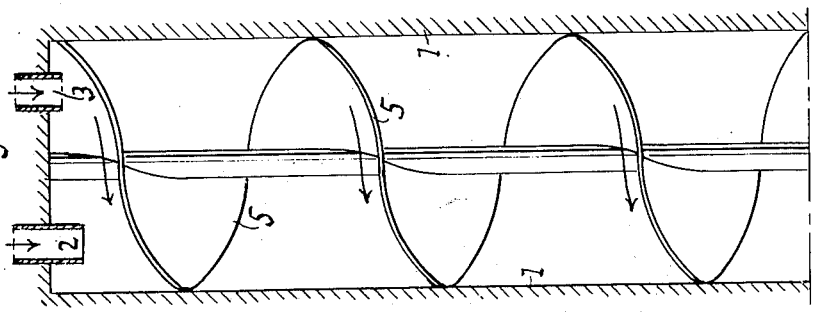
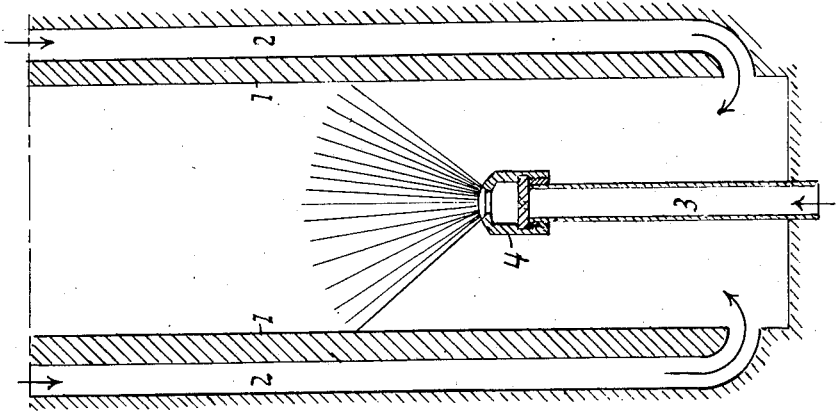
Carl Krauch  INVENTORS
Mathias Pier
BY
Hauff&Warland,
ATTORNEYS Dec. 6, 1932.   C. KRAUCH ET AL   1,890,435
PRODUCTION OF VALUABLE LIQUID PRODUCTS FROM TARS, MINERAL
OILS, AND THE LIKE CARBONACEOUS MATERIALS
Filed Aug. 13, 1926   2 Sheets-Sheet 2

Carl Krauch  INVENTORS
Mathias Pier
BY
ATTORNEYS

Patented Dec. 6, 1932

1,890,435

UNITED STATES PATENT OFFICE

CARL KRAUCH, OF LUDWIGSHAFEN-ON-THE-RHINE, AND MATHIAS PIER, OF HEIDELBERG, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF VALUABLE LIQUID PRODUCTS FROM TARS, MINERAL OILS, AND THE LIKE CARBONACEOUS MATERIALS

Application filed August 13, 1926, Serial No. 129,096, and in Germany August 14, 1925.

This application is a continuation-in-part of application 86,646 filed February 6, 1926.

The claims of this case as will be noted hereinafter differ from the claimed subject matter of said case 86,646 in defining a particular physical condition of the hydrogenating gas and the liquid starting materials employed in the process claimed herein.

It is known that bituminous materials of the nature of coal, brown coal (lignite), tars, mineral oils, distillation or conversion products or residues thereof, asphaltic materials and similar materials which are hereinafter referred to as bituminous materials can be converted into benzine, gasoline, lubricating oil or similar valuable liquid products by a process which we have called a "destructive hydrogenation" which means the action of hydrogen or gases containing hydrogen at an elevated temperature preferably under high pressures and in the presence of catalysts. In the usual manner of working in which hydrogen is mixed with the materials to be hydrogenated by means of a stirrer or the like, considerable risk occurs of the initial materials being charred with a formation of coke, whereby choking of the apparatus, discontinuance of work and other drawbacks are caused. The destructive hydrogenation is, as is known, carried out at temperatures between about 300 and 700° C.

We have now found that the said drawbacks can be avoided and the yield of valuable, more or less thin liquid products can be increased by exposing the liquid bituminous materials, such as tar or mineral oils in the vaporized state (by which expression we understand the gaseous, vaporous and nebulized state) to the action of hydrogen or gases containing or giving rise to hydrogen. Suitable temperatures are those above the point when a decomposition of the initial materials sets in, and the pressure amounts generally to at least 50 atmospheres, preferably 100 atmospheres or more. It is, however, possible to work with lower pressures, that is down to about 10 atmospheres, when a catalyst containing molybdenum is employed. By this manner of working the contact of the starting material with the hydrogen-containing gas is rendered much more intimate than with the methods of working hitherto in use. Preferably the materials to be hydrogenated are introduced in small quantities into the sufficiently heated reaction vessel and are converted therein into a gas or vapor, mist or dust preferably by mechanical means and with the aid of the hydrogen introduced into the vessel. Or the tars, mineral oils, and the like alone or together with inert gases or readily vaporizable substances are introduced into the reaction vessel filled with hydrogen by suitable means for example by means of nozzles or the like. In some cases local superheating of the vaporizing or distributing device may be of advantage for the completion of the action.

The initial materials may also be brought into an intimate contact with the hydrogen-containing gas by exposing them in a thin film to the treatment with hydrogen or gases containing or giving rise to hydrogen; thin films of material may be produced for example on large surfaces, preferably of metals which are not chemically attacked and therefore remain smooth. For example the material to be treated is conveyed in a downward direction through the reaction vessel on a screw-shaped sheet or over a corrugated sheet metal, or plate or the like. Also bundles of corrugated plates, or bars or the like may be employed provided care is taken that the passage of the liquid is not hindered. The surfaces over which the material is passed, are preferably made of catalytically acting metals or of materials which do not give rise to the formation of coke and methane, for example of special steels containing chromium and the like. The intimate contact of the starting material with hydrogen and its effect on the result of the process may be further increased by other suitable means such as mechanical movement, for example rotation, of the large surfaces. When working as hereinbefore described it is often advantageous to mix the initial materials with such solid materials as are capable of increasing the surface of contact with hydrogen and which are preferably employed in the form of a paste; as suitable materials, for example magnesia, wood dust, diatomaceous earth and the like, alone or in mixture with solid catalysts may be mentioned.

The fine division and rapid gasification of the materials to be hydrogenated may also be effected by introducing the hydrogen-containing gas into the mass through a fine-porous, permeable material, which may be employed in the form of a single coherent body for example in the form of a plate forming a bottom in the reaction vessel, on which the initial material rests and through which the hydrogen-containing gas is pressed from below, or in the form of lumps; the porous material may consist for example of glass, quartz, clay, metal, charcoal and the like and may be heated to the temperature of the reaction or to still higher temperatures, if so desired. By this manner of working, for example a liquid to be hydrogenated is vigorously stirred up and the gas is brought into contact therewith in a state of very fine subdivision. The size of the fine gas bubbles can be varied to a considerable extent by the size of the pores and the thickness of the layer of porous material and by the pressure and speed of the gas current. For example, in the destructive hydrogenation of middle oil to benzine-like hydrocarbons the size of the pores and accordingly the speed of the gas may be so chosen as to convert all liquid material into a fine lather, whereby the gas is brought into most intimate contact with thin layers of liquid. The height to which the lather rises, may be controlled by any suitable means such as sieves and the like. It may also be advantageous to make only part of the support for the material to be hydrogenated of porous material so that for example a circulating movement within a liquid or lather is produced. In some cases it is sufficient that only part of the gas is introduced through the porous material.

The accompanying drawings illustrate diagrammatically by way of example some modes of carrying out the present invention. It is to be understood that the invention is not limited to these particular examples, which may be modified in a great variety of ways without departing from the scope of the invention. The figures represent sections through reaction vessels of different construction, and corresponding parts are marked with the same reference numbers.

In the apparatus shown in Figure 1, a reaction vessel 1 is provided with hydrogen supply pipes 2. The carbonaceous material is supplied by a pipe 3 and atomized into the reaction vessel 1 by a nozzle or similarly acting device 4.

In the construction illustrated by Figure 2, the vertical reaction vessel 2 is provided with a screw-shaped sheet metal 5, over which the carbonaceous material supplied by pipe 3 flows in a downward direction. The gas containing hydrogen supplied by a pipe 2 may be passed through the reaction vessel in the same direction as the carbonaceous material or, by suitably modifying the apparatus, in a counter-current thereto.

In the devices shown in Figures 3 and 4, the carbonaceous material rests on a porous plate 6, onto which it is supplied by a pipe or pipes 3. The hydrogen-containing gas is introduced from below through a pipe or pipes 2, pressed through the porous plate 6 and enters the carbonaceous material in a very finely subdivided condition.

Figure 5:
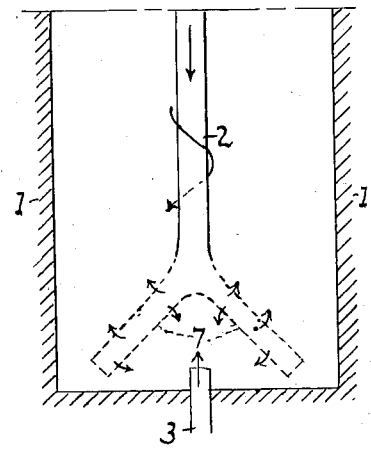

According to the arrangement illustrated by Figure 5, the hydrogen supply-pipe 2 is made of porous material 7 at its lower ends, through which the gas enters the carbonaceous material in a finely divided condition. The hydrogen supply-pipe 2 with its porous ends 7 may be constructed as a stirrer, thus further providing for a fine distribution of the gas and for an intimate contact thereof with the carbonaceous material.

Figure 6:
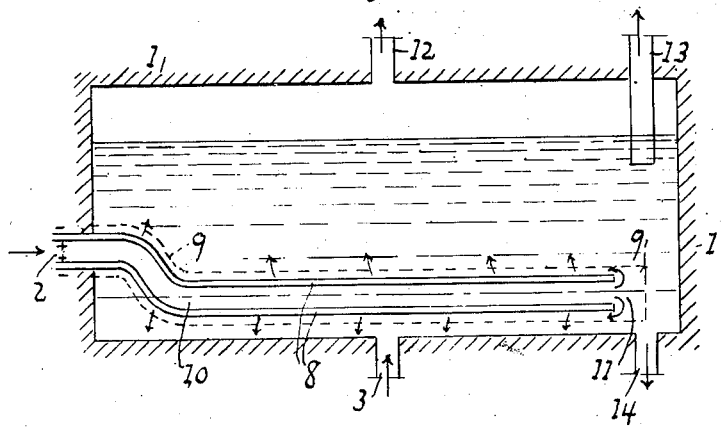

Figure 6 illustrates a horizontal reaction vessel 1 into which the carbonaceous material is supplied by a pipe 3 and wherein it is heated by the electric heating device 8 arranged within a porous pipe 9 connected with the hydrogen supply 2. The hydrogen passes through the inner part 10 of the heating device, whereby it is heated and enters the porous tube 9 at 11. By means of the porous tube 9, it enters the carbonaceous material in a finely divided condition. If desired, the heating device 8 and porous mantle 9 may be constructed as a stirrer rotating around the axis of the supply pipe 2. The resulting gases and vapors leave the reaction vessel by a pipe 12, whereas liquids and residues may be withdrawn by pipes 13 and 14, respectively.

The said and similar means for effecting fine division and rapid gasification of the starting material may be employed each alone or in conjunction with each other. Preferably the presence of projecting surfaces against which the material not yet hydrogenated might dash and by which it might be condensed, is avoided. Catalysts favorably influencing the reaction may be added to the gas or the carbonaceous material or both.

We have further found that it is advantageous in the destructive hydrogenation of carbonaceous materials, whether in a finely sub-divided state or not, to keep the partial pressure of the products, especially of those of low boiling point, very low within the reaction vessel, i. e. to employ hydrogen in great excess. The volume of hydrogen may of course vary quite considerably as long as an amount is employed which is in excess of that actually required for the conversion; the rate of flow of hydrogen may for instance be in excess of about 600 litres per kilogram of carbonaceous material. The vaporous feed rate may in addition be one or even one and one-half volumes per hour per volume of reaction space. The partial pressure of the desired products should not exceed 10 per cent of the total pressure; preferably it amounts only to from 1 to 5 per cent; for example, under a total pressure of 200 atmospheres, it should not exceed between 5 and 20 per cent. The process may be carried out with streaming gases, preferably in a circular course without the pressure of the gas being released. In order to keep the partial pressure of the desired products low, the speed of the gas, the quantity of starting material employed and the temperature must be suitably controlled. When working in a circular course the hydrogen or gas containing hydrogen after the quantity consumed in the reaction being compensated for by fresh gas, may serve again for finely dividing a small quantity of starting material and destructively hydrogenating it.

Solid starting materials such as coal, lignite or the like are preferably introduced into the reaction vessel in the form of a paste which may be conveyed in a counter-current to the hydrogenating gas with which it is brought into contact. If desired, the residues and the parts not hydrogenated or projected onto the walls of the vessel are collected by any suitable device and again finely divided in the manner described or removed in any suitable manner.

The parts of initial material which are not sufficiently hydrogenated in a single treatment, may be treated in a similar manner in further reaction vessels arranged behind the first reaction vessel or they may be introduced again into the reaction vessel in a circular course without releasing the pressure while making up for the part converted and removing the residues and slags in any suitable manner.

The separation of high-boiling or solid materials such as paraffin hydrocarbons of high boiling point, on the walls and projecting surfaces of the vessel, which separated materials can often be removed only difficultly and cause trouble by damage done to the catalysts, choking and the formation of coke, can be avoided by subjecting only such starting material to the treatment as boil within a rather narrow range of temperatures. In the treatment of solid starting materials such as coal, lignite, asphalts, resins, pitches and other solid residues of mineral oils, tars and the like, the initial materials are first converted completely or partially into liquids, for example by dry distillation, low temperature coking, destructive hydrogenation or the like. The liquid materials so obtained and also originally liquid starting materials such as minerals oils are divided into fractions boiling within narrow ranges of temperatures and each of these fractions is then subjected to destructive hydrogenation with the conditions being chosen according to their composition.

Or initial materials boiling within wide limits may be employed, for example by adding to a certain fraction other materials the boiling point of which is totally or partly outside the range of temperatures within which the fraction to be hydrogenated boils; the mixture is subjected to a preliminary treatment such as destructive hydrogenation or cracking in such a manner that it is converted into liquids the boiling point of which lies within the desired range of temperatures. These liquids are then further treated in the same or in another apparatus. Preferably fractions of high boiling point are destructively hydrogenated in a finely divided liquid state, whereas fractions of lower boiling point are treated in the vapor phase.

The process here described is carried out with particular advantage with fractions of middle boiling point consisting chiefly of middle oils, generally of a boiling point between about 200° and 350° C., which are subjected to destructive hydrogenation in the vapor phase. Thereby the process can be carried out on an industrial scale for a long time without any trouble being caused by the formation of high-boiling or solid products and with very good yields of low-boiling, benzine-like hydrocarbons.

Especially such middle oils are suitable as are obtained by the conversion of high-boiling liquid initial materials for example by cracking with or without the aid of contact masses or by hydrogenation with or without the employment of pressure or catalysts or both and suitable fractionating.

The troublesome separation of high-boiling or solid products can also be avoided by alternately treating different initial materials. As soon as the formation of the desired, especially low-boiling products from a certain starting material diminishes, another initial material is employed, the composition of which is different from that of the material first employed. For example, liquid and solid materials may be employed alternately; however, it is more advantageous to employ alternately liquid materials of different kind, for example tars and mineral oils or mineral oils of different origin or fractions thereof.

When carrying out the process with the aid of contact masses, catalysts of a porous nature such for example as porous coals for example active charcoal, glowed wood charcoal, or silicates, especially hydrosilicates, active silica and other porous materials, are very suitable. As examples of other contact masses, we mention molybdenum, chromium, tungsten or elements of the second to fourth group of the periodic system or their compounds, if desired with other additions such as alkalis or elements of the seventh or eighth group, for instance copper-iron, cobalt or their compounds. We prefer to designate these catalysts as "catalysts immune to sulfur poisoning".

All parts of the apparatus which come into contact with the hot reaction gases, are preferably made of or coated with material which does not give rise to the formation of coke and methane and which is not attacked by sulfur and its compounds, for example of aluminium or special steels rich in chromium.

The hydrogen consumed in the process may be replaced by water vapor or mixtures thereof with hydrogen. Not only does the hydrogenation proceed more rapidly and is the danger of coking avoided thereby practically completely, but also the formation of methane which is of comparatively low value and causes trouble when working in a circular course, is considerably reduced.

The following examples will further illustrate, how our invention may be carried out in practice, but the invention is not limited to these examples. The parts are by weight.

Example 1

Crude lignite tar is passed with an excess of hydrogen under a pressure of 200 atmospheres at 450° C. in the form of a fine mist over a contact mass containing tungsten. The gases leaving the reaction vessel are cooled, whereby thinly liquid, light-colored products are separated, from 30 to 40 per cent of which are benzines boiling up to 150° C.

When working in the manner here described, no formation of coke occurs even when the process is carried out for a long time, whereas when working with initial material in liquid, but not atomized form, coke is easily separated at the superheated parts of the apparatus, the presence of which cannot be avoided. As by the initial material being atomized its mixture with the reducing gas is rendered more intimate and the reacting surface is increased, the quantity of material treated in a given time is greater than when working with a body of liquid mass.

Example 2

A mixture of 1 part of brown coal (lignite) containing 40 per cent of water with 2 parts of crude mineral oil of German origin is introduced in the form of a fine mist under a pressure of 200 atmospheres into a high pressure reaction vessel and acted upon at 450° C. with a mixture of hydrogen and nitrogen. In a short time, the coal is converted nearly completely into valuable liquid products. The operation can be carried out for a long time without troublesome separation of coke and a much greater quantity of initial material can be treated than when working without atomizing.

Example 3

Crude mineral oil is atomized to a current of hydrogen, which is employed in excess, and passed under a pressure of 200 atmospheres through a reaction vessel heated to 450° C. The products which are not carried away by the gas current, are separated and subjected again to the said treatment. The gases and vapors leaving the reaction vessel are cooled, whereby a thinly liquid product is separated which contains from 60 to 70 per cent of benzine-like hydrocarbons. No separation of coke is observed in the reaction vessel.

Example 4

In a vertically arranged high pressure vessel, the hot parts of which consist of or are coated with aluminium, a crude Panuco mineral oil is passed over an aluminium sheet arranged in the form of a screw. An excess of hydrogen is passed through the reaction vessel under a pressure of 200 atmospheres and at between 450° and 475° C. in the same direction as the oil or in a counter-current thereto.

On cooling the vapors leaving the reaction vessel, a product is obtained, between 70 and 80 per cent of which consists of benzine-like hydrocarbons. The hydrogen may be circulated by means of a pump. The higher boiling components of the product may be subjected anew to the said treatment or they may be worked up in any other way for example to lubricating oils. No separation of coke occurs in the reaction vessel and the losses by formation of gaseous products are very small.

The oil may be mixed with catalysts such for example as molybdic acid or the like.

Example 5

In an apparatus, the hot parts of which are coated with an alloy obtained by melting in vacuo and containing about 10 per cent of chromium, 2 per cent of molybdenum, 10 per cent of cobalt and about 75 per cent of iron, a middle oil is continuously introduced onto a porous plate consisting of sintered glass powder, while hydrogen is introduced from below through said porous plate. The reaction is carried out under a pressure of 10 atmospheres. Depending on the speed of the gas current the liquid is intensely stirred up or converted into a lather. On heating the reacting materials to about 550° C. a product, the boiling-point curve of which is about 30° C. lower than that of the middle oil, and which contains about 25 per cent of benzines, is obtained in a nearly theoretical yield. By the addition of catalysts, the result can be improved to a far-going extent. The residue obtained by separation of the benzines may be treated anew in the said manner. The height to which the lather rises, may be limited by any suitable means, for example by sieves or the like.

Example 6

A paste consisting of 1 part of brown coal (lignite) containing between about 5 and 10 per cent of moisture, 1 part of heavy anthracene oil and 1 per cent of bauxite is passed in a finely divided state under a total pressure of 200 atmospheres at 450° C. with a current of hydrogen preheated about to the reaction temperature, which is employed in a quantity of from 12 to 15 cubic metres to each litre of the coal paste, through a vertical reaction vessel, the hot parts of which are coated with aluminium.

Between about 80 and 85 per cent of the carbon contained in the coal are converted into liquid products. On cooling the gases leaving the reaction vessel a liquid product is obtained which contains about 60 per cent of middle oils besides about 10 per cent of benzines. No separation of coke and practically no formation of methane occur in the furnace. The solid residue is removed from the reaction vessel in any suitable manner; the hydrogen is circulated by means of a pump while making up for the part consumed by the reaction by the addition of fresh gas.

Example 7

A middle fraction of a crude mineral oil containing small amounts of higher boiling constituents in a finely divided state is passed in a current of hydrogen in excess under a pressure of 200 atmospheres at 480° C. over active charcoal. After some time the efficiency of the catalyst diminishes, resulting in the contents of the product in benzines falling from between 70 and 90 per cent to between 40 and 50 per cent. Further, some high-molecular compounds are formed which must be removed from the reaction vessel.

When employing thereupon another initial material, for example, a hydrogenation product boiling above 200° C. of the same crude mineral oil or of a brown coal producer tar, the formation of benzines is again increased to about the original percentage.

Now what we claim is:

1. The process for producing low boiling hydrocarbons from liquid bituminous materials by destructive hydrogenation with an added hydrogenating gas which comprises subjecting said bituminous materials to the action of said hydrogenating gas while said materials are finely dispersed therein, under a continuously maintained pressure of at least 50 atmospheres, a temperature of the order of those employed in destructive hydrogenation and in the presence of a catalyst immune to sulfur poisoning.

2. The process for producing low boiling hydrocarbons from liquid bituminous materials by destructive hydrogenation with an added hydrogenating gas which comprises subjecting said bituminous materials to the action of said hydrogenating gas while said materials are in the vaporized state, under a continuously maintained pressure of at least 50 atmospheres, a temperature of the order of those employed in destructive hydrogenation and in the presence of a catalyst immune to sulfur poisoning.

3. A process for the production of low boiling hydrocarbons by destructive hydrogenation of a liquid bituminous material which comprises introducing said material, while substantially completely in the state of a fine mist, into a space continuously maintained at a temperature of the order of those employed for destructive hydrogenation and a pressure of at least 50 atmospheres, and which contains a catalyst immune to sulfur poisoning, and subjecting said material while in said space to the action of an added hydrogen containing gas.

4. The process as defined in claim 3 wherein said bituminous material is a mineral oil.

5. A process for producing low boiling hydrocarbons from liquid bituminous materials which comprises subjecting said materials while in the state of a fine mist to the action of hydrogen under a continuously maintained pressure of about 200 atmospheres, a temperature of about 450° C. and in the presence of a catalyst immune to sulfur poisoning.

6. A process for the production of valuable liquid hydrocarbons from tar which comprises passing said tar with an excess of hydrogen under a pressure of about 200 atmospheres, at about 450° C. in the form of a fine mist over a contact mass containing tungsten.

In testimony whereof we have hereunto set our hands.

CARL KRAUCH.
MATHIAS PIER.